J. DUNDAS.
Wheel-Cultivator.
No. 2,380. Reissued Oct. 16, 1866.
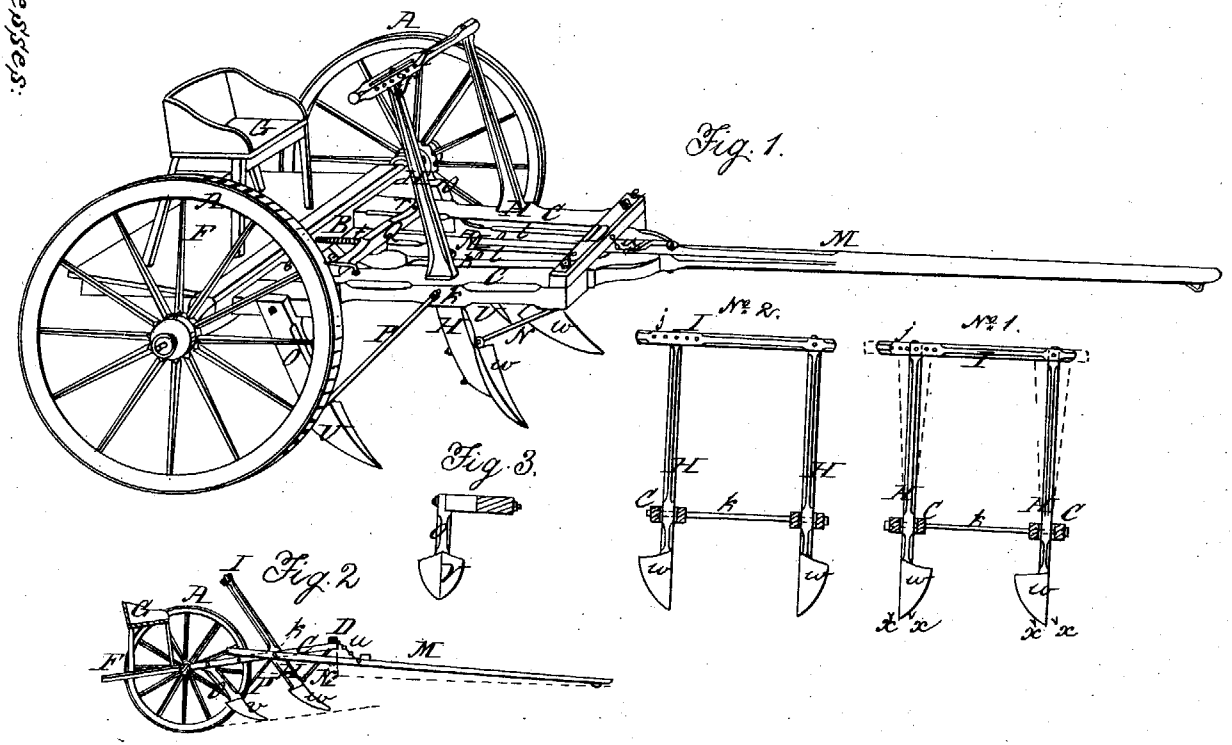
Witnesses:
W. L. Benneu
F. W. Wurster
Inventor.
James Dundas
by his Attorney
C. S. Kendrick
N. PETERS, PHOTO-LITHOGRAPHER, WASHINGTON, D. C.

UNITED STATES PATENT OFFICE.

JAMES DUNDAS, OF NEMAHA, NEBRASKA.

IMPROVEMENT IN CULTIVATORS.

Specification forming part of Letters Patent No. 22,859, dated February 8, 1859; Reissue No. 2,380, dated October 16, 1866.

*To all whom it may concern:*

Be it known that I, JAMES DUNDAS, formerly of Little Rock, in the county of Kendall and State of Illinois, and now of the county of Nemaha, in the Territory of Nebraska, have invented a new and useful Machine for Cultivating Corn, called the "Dundas Corn-Cultivator," of which the following is a full and exact description.

The object of my invention is to cultivate Indian corn and such large plants that are planted in rows, with wide spaces between the rows, by horse-power.

Previous to my invention it was customary to cultivate such plants in one of three ways, first, by hand hoeing; second, by plows or by cultivators dragged by horse-power between the rows, some of which cultivators had a series of plows secured to a frame carried by wheels, but arranged in a single gang, so as to till the soil at one side only of a row of plants; third, by implements which have been termed "straddle-row cultivators," and which consist, substantially, of two gangs of plows, of either shovel or other form, arranged at opposite sides of a frame, which straddles the row of plants, so that the strips of soil at both sides of the same row are simultaneously cultivated. In these machines the attention of the conductor is concentrated upon a single row of plants, and the work of the machine is limited to tilling the soil at opposite sides of such one row, so that the plants of that row may be cultivated however the distance between it and the adjacent rows may vary.

My invention has reference to the class of machines last above referred to; and its objects are to facilitate the labor of cultivation by limiting the depth to which the plows can enter the soil by means of wheels running upon it; to enable the conductor of the machine to ride upon it, thereby lessening the labor; to enable him to direct the plows at opposite sides of the row of plants simultaneously, and to permit the plows to be raised from the ground as required.

To these ends my invention consists of certain combinations and arrangements of the following instrumentalities, viz:

First, wheels whose function is to sustain the weight of the machine and to limit the distance to which the plows can penetrate the soil.

Second, a frame whose function is to connect the plows with the wheels and their arms or axle, and with the tongue to which the horses are applied; also, to form, in connection with the wheels, a carriage upon which the conductor of the machine can ride.

Third, a series of plows arranged in two gangs, with a space between the gangs, so that the gangs may simultaneously till the strips of soil at opposite sides of a single row of plants which may stand in the space between the gangs. This member of my combitions is not restricted to any particular form of the individual plows, but is limited to the arrangement of the plows in two gangs, the members of each of which are nearer together, measuring crosswise to the line of progression of the machine, than the width of the central space which separates the two gangs, so that a central strip of soil between the two gangs is left untilled, while the strips at each side of that central strip are thoroughly tilled.

Fourth, movable bars or stocks for the innermost plows of the two gangs, the direction in which they are movable being crosswise to the line of progression, and the relation of the movement being to that line, or, in other words, to the line connecting the center of the axle of the wheels of the machine with the point of the tongue, so that while the machine is drawn forward the plows may be moved laterally to the line of progression, so as to conform to plants which are not exactly in that line.

Fifth, a cross-bar or other connection between the movable plows of the two gangs, so that the plows at opposite sides of the central space may be moved simultaneously to make their positions conform with that of the plants standing in that space.

Sixth, a seat for the driver, so that the driver may ride upon the machine while directing the plows.

Seventh, mechanism to permit the plows to rise and descend relatively to the wheels, so that the plows may be raised from the soil and carried above it by the wheels.

To enable others skilled in the art to make and use my invention, I will proceed to describe the construction and operation of the straddle-row cultivator in which I embodied it previous to filing my application for the original patent, and in which I made use of plows of what is commonly known as the "shovel form;" and I will refer to the accompanying drawings, wherein—

Figure 1 represents a perspective view of the machine; Fig. 2, a longitudinal section of the same. No. 1 represents the movable shovels arranged to throw the earth toward the plants in the row to which the machine is applied; No. 2, the same arranged to throw the earth from the plants. No. 3 represents a front view of one of the outside shovels.

Let A A represent two ordinary wagon-wheels; B, an axle resting in the hubs of the wheels. C C are two pieces of timber passing through the axle. The forward ends of the pieces C C are connected by the bar D by means of the bolts *e e*. The beams C C pass outward back of the axle B, forming supports for the platform F. The timbers C C, bar D, axle B, and platform F constitute, in this example, the frame of the machine.

I place a seat for the driver on the platform F and secure it to the same. The seat is represented at G. I pass two inclined bars through mortises cut in the beams C C. These bars are shown at H H, being connected at the upper end by the cross-bar I, which has a slot for one of the bars H, as shown in Fig. 1, the bar H being secured at any point in the slot by inserting the pin *j*.

The bars H H are supported on the iron rod *k k*, passing through the timbers C C, the hounds *l l*, and the tongue M; and the slots in the timbers C C are made flaring, as seen in section at No. 1 and No. 2, so that the bars can be rocked laterally or moved upon the bar *k*, which connects them with the frame of the machine. These movable inclined bars have shovels *w w* secured to their lower ends, so that they constitute movable stocks for said shovels.

N N represent two connecting bars or braces attached to the heads of the bolts *e e*, and by means of eyebolts to the lower ends of the bars H H. I also bolt to the side of the beams C C two other inclined bars or stocks, as shown at O O, and brace them by means of iron rods, as shown at P.

Q represents a cross-bar, resting on the upper sides of beams C C, and working on a pivot at *r*. The opposite end is placed under the iron staple *s*. I insert a spring between the bar Q and the axle B, as shown at *t*. This spring presses the bar Q against the end of the tongue M.

I attach a short piece of chain to the machine, as shown at *u*. One end of said chain is fixed to the cross-bar D, and the other end to the tongue M.

*v v* represent ordinary cultivator-shovels, attached to the bars O O, which form their stocks.

*w w* represent two half-shovels, attached to the lower ends of the bars H H, which form movable stocks for them.

The operation of this machine is as follows: First, the tongue M is movable on the rod *k*; consequently the bar D rests upon the upper side of the tongue. Then, the bar Q being pressed against the end of tongue, the beams C C are retained in the same plane with the tongue. In this position the machine is in readiness to cultivate the corn.

When it is desired to withdraw the shovels and elevate them above the surface of the ground, the driver places one of his feet against the bar Q, and, drawing it slightly backward, releases the end of the tongue, and the weight of the driver causes the platform to descend, tilting the front part of the frame upward in the position as shown at Fig. 2. The chain *u* prevents the frame from tilting too far, and the bar Q, being released by the foot, is forced forward by the spring *t* and passes under the end of the tongue M, which fixes the machine in the position as shown at Fig. 2, with the shovels raised above the ground.

In the machine thus described and represented the series of plows is composed of the four members or shovels *v v w w*, which are arranged in two gangs, each composed of two shovels, *v w*, and the two members of each gang are nearer together, measuring crosswise with the machine, than the innermost shovels, *w w*, of the two gangs are. Hence the two gangs are adapted to tilling two strips of soil at the opposite sides of a central strip which is left untilled between the innermost two plows, *w w*, and in which the row of plants to be cultivated stands.

An oscillating or side motion can be given to the shovels *w w* by the driver pressing the bar I either right or left, the mortises in the beams C C being enlarged at the sides to allow the bars H H to play sidewise, as shown by the dotted lines on No. 1, bringing the points of the shovels at *x x* alternately. By this operation, if the plants are not in a straight line, the driver, while sitting upon the machine, can avoid them by moving the shovels to the right or left. Moreover, as the driver's seat is behind the innermost shovels of the two gangs, which are in full view of the driver, he can observe their operation and direct them as required to avoid the plants which are not in the line of progression of the machine. Observe that the half-shovels can be taken out and reversed for the purposes before mentioned in this specification.

Having thus described a machine embodying my invention, I declare that I do not claim to have invented the individual members which are combined together to constitute my invention; nor do I claim to be the first who combined a series of plows or other cultivator-shares with a frame and wheels, all my combinations being restricted to the arrangement of the series in two gangs, as above described, so as to straddle a single row of plants and till the soil at both sides thereof simultaneously.

What, therefore, I claim as my invention, and desire to secure by Letters Patent, is—

1. The combination, in a straddle-row cultivator, of the following instrumentalities, viz: the two wheels, frame, and a series of plows arranged in two gangs, with a central space between the gangs, so as to till the soil simultaneously at both sides of a single row of plants, which the machine straddles, all of these operating in the combination substantially as set forth.

2. The combination, in a straddle-row cultivator, of the following instrumentalities, viz: the two wheels, frame, series of plows arranged in two gangs, as aforesaid, and seat for the driver, all of these operating in the combination substantially as set forth.

3. The combination, in a straddle-row cultivator, of the following instrumentalities, viz: the two wheels, frame, the series of plows arranged in two gangs, as aforesaid, and movable stocks, all operating in the combination, so that while the wheels limit the penetration of the plows, the inner plows of the two gangs may be moved laterally to avoid the plants that are out of line in the row, substantially as set forth.

4. The combination, in a straddle-row cultivator, of the following instrumentalities, viz: the two wheels, frame, the series of plows arranged in two gangs, as aforesaid, movable stocks, as aforesaid, and driver's seat, all operating in the combination substantially as set forth.

5. The combination, in a straddle-row cultivator, of the following instrumentalities, viz: the two wheels, frame, the series of plows arranged in two gangs, as aforesaid, driver's seat, and a connection between the movable plows, all operating in the combination substantially as set forth.

6. The combination, in a straddle-row cultivator, of the following instrumentalities, viz: the wheels, frame, series of plows arranged in two gangs, as aforesaid, and mechanism to permit the plows to be raised relatively to the treads of the wheels, all constructed and operating in the combination substantially as set forth.

In testimony whereof I have hereunto set my hand this 23d day of February, 1866.

JAMES DUNDAS.

Witnesses:

CHAS. G. DORLEY,

S. M. RICH.